US009049017B2

(12) United States Patent
Speight

(10) Patent No.: US 9,049,017 B2
(45) Date of Patent: Jun. 2, 2015

(54) EFFICIENT TCP ACK PRIORITIZATION IN WIRELESS NETWORKS

(75) Inventor: Timothy J. Speight, Bristol (GB)

(73) Assignee: Sony Corporation, Tokyo (JP)

( * ) Notice: Subject to any disclaimer, the term of this patent is extended or adjusted under 35 U.S.C. 154(b) by 889 days.

(21) Appl. No.: 11/542,514

(22) Filed: Oct. 2, 2006

(65) Prior Publication Data

US 2008/0080464 A1    Apr. 3, 2008

(51) Int. Cl.
H04B 7/00 (2006.01)
H04L 1/18 (2006.01)
H04L 1/12 (2006.01)

(52) U.S. Cl.
CPC ......... H04L 1/1854 (2013.01); *H04L 2001/125* (2013.01)

(58) Field of Classification Search
CPC ... H04L 1/1819; H04L 1/0009; H04L 1/1887; H04L 1/0003; H04L 1/0071; H04L 1/1874; H04W 28/04
USPC .................................. 370/229, 235; 455/509
See application file for complete search history.

(56) References Cited

U.S. PATENT DOCUMENTS

| | | | | |
|---|---|---|---|---|
| 6,078,564 | A * | 6/2000 | Lakshman et al. | 370/235 |
| 6,894,974 | B1 | 5/2005 | Aweva et al. | |
| 7,177,371 | B1 * | 2/2007 | Hudson et al. | 375/308 |
| 7,260,601 | B1 * | 8/2007 | Day et al. | 709/203 |
| 7,292,825 | B2 * | 11/2007 | Beale et al. | 455/67.11 |
| 7,359,326 | B1 * | 4/2008 | Harper et al. | 370/235 |
| 2002/0095519 | A1 * | 7/2002 | Philbrick et al. | 709/250 |
| 2003/0021243 | A1 * | 1/2003 | Hamalainen | 370/329 |
| 2003/0031203 | A1 * | 2/2003 | Fukui | 370/469 |
| 2003/0074465 | A1 | 4/2003 | Tang et al. | |
| 2004/0003105 | A1 * | 1/2004 | Berzosa et al. | 709/232 |
| 2004/0037224 | A1 * | 2/2004 | Choi et al. | 370/235 |

(Continued)

FOREIGN PATENT DOCUMENTS

EP    1 557 968    7/2005
WO    WO 00/27140    5/2000

OTHER PUBLICATIONS

International Search Report Dated Jan. 25, 2008 from PCT/EP2007/060443.

(Continued)

*Primary Examiner* — Christopher M Brandt
*Assistant Examiner* — Joseph Dean, Jr.
(74) *Attorney, Agent, or Firm* — Oblon, McClelland, Maier & Neustadt, L.L.P.

(57) ABSTRACT

An improved acknowledgement (ACK) prioritization scheme is disclosed that provides ACKs with a lower block error rate (BLER) (as opposed to data) over an air interface, provides a separate radio bearer for ACKs, and successively increases the priority of ACKs for each retransmission required. A lower BLER target for ACKs may be achieved by an increase in transmit (Tx) power, additional coding for the radio bearer, or the use of diversity or hybrid automatic repeat request (ARQ) schemes. After packets are identified as either data or an ACK, they are sent to separate Tx buffers over separate radio bearers. Because the ACKs are transmitted over separate bearers and Tx buffers as compared to the data, ACKs are never queued behind the data, and are effectively prioritized as compared to the data. When retransmissions are required for an ACK packet, the scheduling prioritization is increased successively for each ACK retransmission required.

43 Claims, 5 Drawing Sheets

(56) References Cited

U.S. PATENT DOCUMENTS

| | | | |
|---|---|---|---|
| 2004/0073697 A1* | 4/2004 | Saito et al. | 709/233 |
| 2004/0223507 A1 | 11/2004 | Kuchibhotla et al. | |
| 2005/0201319 A1* | 9/2005 | Lee et al. | 370/321 |
| 2005/0276252 A1* | 12/2005 | Sizeland et al. | 370/338 |
| 2006/0007880 A1* | 1/2006 | Terry | 370/328 |
| 2006/0084389 A1* | 4/2006 | Beale et al. | 455/67.11 |

OTHER PUBLICATIONS

Communication Pursuant to Article 94(3) EPC from European Patent Application No. 07 820 825.3-1237 Dated Dec. 21, 2009.

* cited by examiner

US 9,049,017 B2

EFFICIENT TCP ACK PRIORITIZATION IN WIRELESS NETWORKS

BACKGROUND OF THE INVENTION

Automatic repeat request (ARQ) is a method for error control in data transmission. When a packet error is detected by a receiver, a request is automatically sent to the transmitter to re-transmit the packet. This process is repeated until the packet is received without an error or the error continues beyond a predetermined number of re-transmissions. Transmission Control Protocol (TCP) is a conventional ARQ-style protocol that is used along with the Internet Protocol (IP) to transmit packets of information. While IP handles the actual delivery of the data, TCP is a connection-oriented, reliable transport protocol that keeps track of the individual packets that comprise a message and utilizes acknowledgement packets (ACKs) in an attempt to ensure that the packets properly arrive at their destination. After a packet of information is transmitted, a response in the form of an ACK is awaited from the receiver as a confirmation that the packet was received.

Because of the delays in a communication system, it is usually not practical to send a single packet of data and wait for an ACK before sending more data. Thus, TCP employs a "window" functionality wherein a certain amount of datagrams or bytes of data can be transmitted without receiving any ACKs. Once the data limit is reached, no more data can be transmitted until ACKs are received. This window is the minimum of the congestion window (cwnd) and the advertised window (awnd) and represents the amount of unacknowledged data the sender transmits. The awnd is negotiated between the client and network at the initiation of a TCP session via a handshake operation, and is ultimately fixed at the client end, where the awnd is defined. The awnd effectively represents the amount of unacknowledged data in the system under steady state, error-free conditions. In typical operating conditions, particularly at the start of the TCP flow, the congestion window (cwnd) can limit the overall amount of unacknowledged data the sender transmits. The cwnd is increased every time an ACK is received, and is decreased every time a packet is lost, and therefore limits throughput in the face of loss.

In wired networks, the total delay or round trip time (RTT) between the transmission of a packet of data by the network and the receiving of an ACK at the network is usually relatively small, and is not a major issue. However, in wireless networks, the RTT can be much longer, and thus the overall throughput rate for TCP connections is often defined not by the wireless communications interface (referred to herein as the "air interface"), but by the RTT. It is therefore necessary in wireless networks to ensure that the sender be able to transmit a large volume of unacknowledged data (i.e. the awnd must be large). Assuming there are no lost packets due to congestion, as mentioned above, in the steady state condition the amount of unacknowledged data in the system will be limited by awnd. The maximum rate achievable is thus:

$$\text{Maximum rate achievable} = \text{Min}(\text{rate available in air interface}, \text{awnd/RTT}. \quad (1)$$

In other words, the max rate achievable is the minimum of the rate available in the air interface and that governed by the awnd and the RTT.

FIG. 1 is an illustration of an exemplary wireless communication link showing the RTT for a TCP segment in a steady state condition. In FIG. 1, a server 100 transmits a TCP segment 102 over an air interface 104 to a client 106. Because the TCP segment is received by the client 106, the client transmits a TCP ACK 108 back to the server 100. The TCP ACK 108 is first sent to a transmit (Tx) buffer 110 prior to its transmission over the air interface 104. The TX buffer acts in a First in First out (FIFO) fashion but because the Tx buffer 110 is empty, the TCP ACK 108 is immediately transmitted out over the air interface 104 back to the server 100, and a RTT 112 is established. For example, if the allocated air interface resources provide the client 106 (typically user equipment (UE)) with 2 Mbps of throughput, RTT=150 ms, and awnd=20000 bytes, then the maximum rate achievable is:

$$\text{Maximum rate achievable} = \text{Min}(2e6, 20000*8/150e-3) = 1.067 \text{ Mbps}. \quad (2)$$

Therefore, in this example, because of the flow control functionality associated with TCP operation, despite the large allocation provided to the user only approximately half the available bandwidth is used. It is also clear from equation (1) that if the RTT increases then the overall throughput will decrease.

However, this example does not take into account that the UE may also be transmitting uplink (UL) data at the same time. If there is no prioritization of ACK packets over regular data traffic, then when the UE transmits UL traffic, the RTT of the ACK for the TCP link in the downlink (DL) is adversely affected.

FIG. 2 is an illustration of an exemplary wireless communication link showing the RTT for a TCP segment when the client 206 is also transmitting DL data 214. In FIG. 2, a server 200 transmits a TCP segment 202 over an air interface 204 to a client 206. Because the TCP segment is received by the client 206, the client transmits a TCP ACK 208 back to the server 200. The TCP ACK 208 is first sent to a transmit (Tx) buffer 210 prior to its transmission over the air interface 104. However, in the example of FIG. 2, UL data 214 to be transmitted from the client 206 has already been forwarded to Tx buffer 210. This data could be the result of a file transfer protocol (FTP) from the UE in the UL direction, a streaming service, and the like. Because the UL data 214 in the Tx buffer 210 is not immediately drained from the Tx buffer, the TCP ACK 208 must wait behind the UL data until all of the UL data in the Tx buffer has been transmitted. In other words, because the TCP ACK 208 for the TCP segment 202 does not have any special priority over the UL data 214, the TCP ACK must wait its turn behind the UL data in the Tx buffer 210. The result is that the RTT 212 increases. Because the RTT 212 has increased in the example of FIG. 2 and because the awnd cannot change dynamically, the maximum rate achievable will decrease. Thus, comparing FIG. 1 to FIG. 2, in FIG. 2 the DL throughput will decrease, because the RTT is increased.

It should be further noted that the performance degradation illustrated in FIG. 2 (as compared to FIG. 1) will be further increased when an asymmetric link is present, for example when there is a large DL throughput and a small UL throughput. In this example, many TCP ACKs 208 will need to be transmitted, and these TCP ACKs will quickly pile up at the back of the Tx buffer 210, while the blocking UL data 214 in the Tx buffer drains very slowly. The DL rate effectively becomes a function of the UL rate, because the DL is limited by the speed at which ACKs can be transmitted back to the network.

The conventional solution to the problem described above, especially with regard to wired networks, is to prioritize ACKs as compared to data packets. Any ACKs would therefore effectively jump the Tx buffer (i.e. be placed at the front of the Tx buffer for immediate transmission), ahead of any UL data. To implement this prioritization scheme, ACKs must first be identified. To make this identification, the processor may inspect a length field within the packet. If the length field indicates that no data is present, then the packet is an ACK.

Although the conventional wired network solution of prioritizing ACKs over data results in improvements to DL throughput, this solution may not be sufficient in wireless networks where communications over the air interface are frequently subject to transmission errors. Therefore, it would be advantageous to improve DL throughput in wireless network using additional ACK prioritization schemes.

BRIEF SUMMARY OF THE INVENTION

Embodiments of the invention expand upon conventional ACK prioritization by transmitting ACKs with a lower block error rate (BLER) (as opposed to data) over the air interface, providing a separate radio bearer for ACKs and data, and successively increasing the priority of ACKs for each retransmission required.

ACK prioritization is a well known technique which improves throughput, particularly in asymmetric links or when the UL is congested with other data. In conventional ACK prioritization, ACKs are identified by dedicated hardware or by the processor and are then scheduled for transmission before data. Embodiments of the invention expand upon conventional ACK prioritization by lowering the BLER for ACKs. A lower BLER for ACKs may be achieved by an increase in Tx power, additional coding for the ACK radio bearer, the use of diversity schemes, and the use of hybrid ARQ schemes.

To obtain lower BLERs for ACKs, after packets to be transmitted are identified as either data or an ACK, they are sent to separate data or ACK Tx buffers through separate data and ACK radio bearers. Because the ACKs are transmitted over separate bearers and Tx buffers as compared to the data, ACKs are never queued behind the data, and radio resources are allocated to the ACK bearer in preference to data, the ACKs are effectively prioritized as compared to the data. The ACK radio bearer also allows for the schemes for lowering the BLER described above to be readily implemented.

In further embodiments of the invention, when retransmissions are required for an ACK, the scheduling priority of an ACK is increased successively for each retransmission required. Thus, not only are ACKs prioritized over data, but re-transmitted ACKs receive increasingly higher priority over other ACKs the more times they are retransmitted, so that ACKs which have been retransmitted twice are always transmitted in preference to ACKs which have been transmitted only once.

DETAILED DESCRIPTION OF THE INVENTION

Embodiments of the invention expand upon conventional ACK prioritization by providing ACKs with a lower block error rate (BLER) (as opposed to data) over the air interface, providing a separate radio bearer for ACKs and data, and successively increasing the priority of ACKs for each retransmission required.

Figure 1:
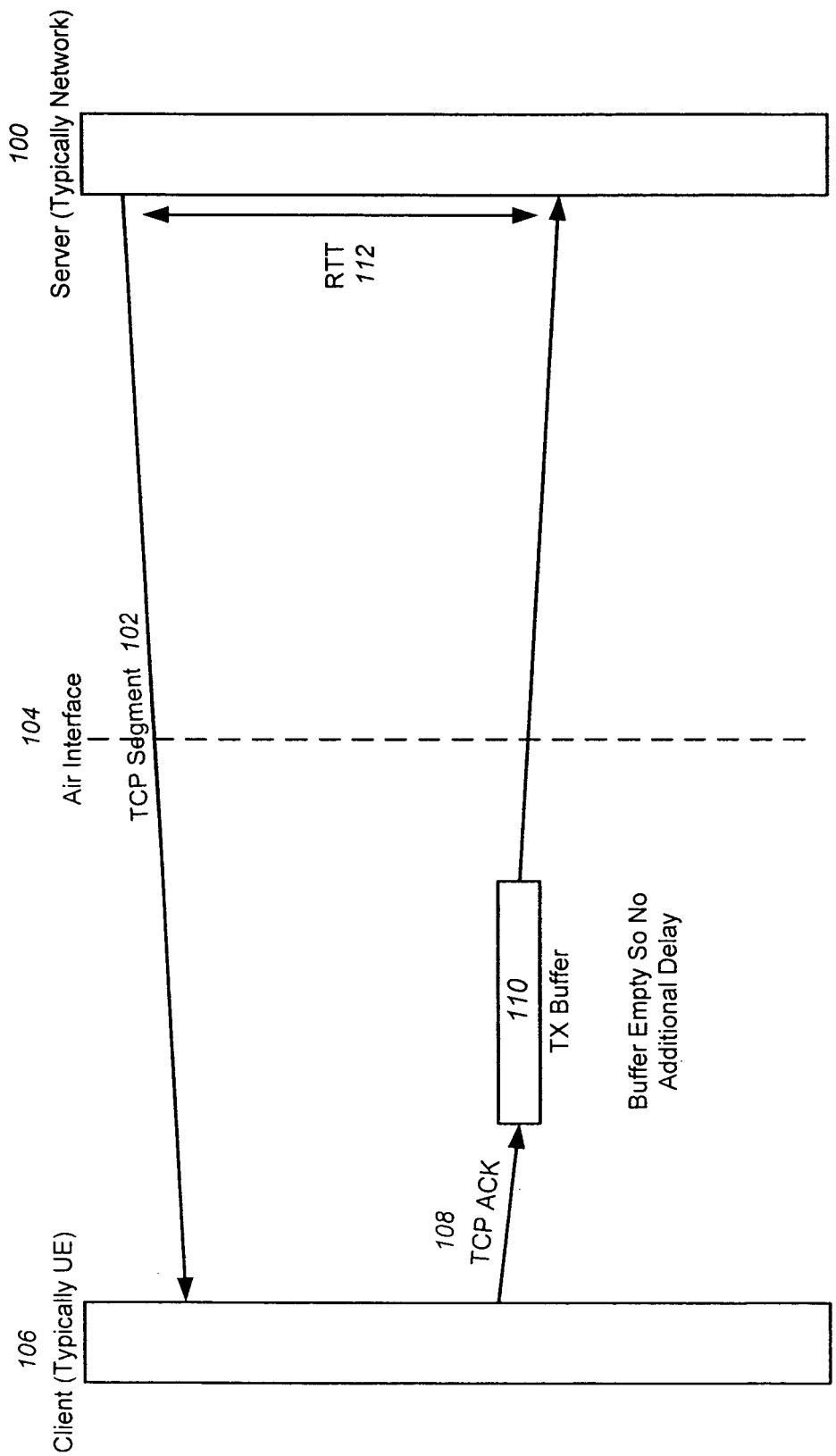
FIG. 1 is an illustration of an exemplary wireless communication link showing the RTT for a TCP segment in a steady state condition.
Figure 2:
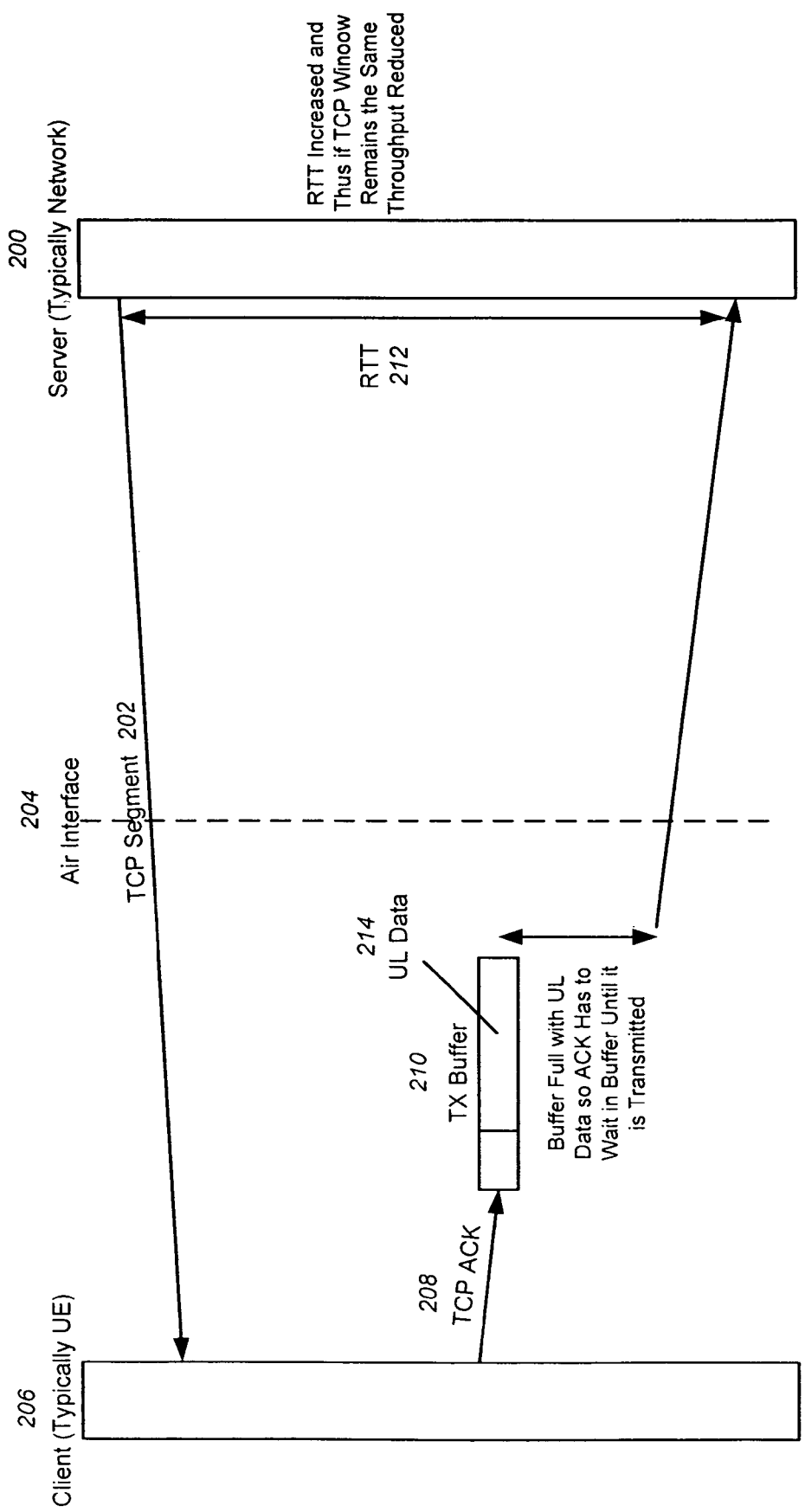
FIG. 2 is an illustration of an exemplary wireless communication link showing the RTT for a TCP segment when the client is also transmitting DL data.
Figure 3:
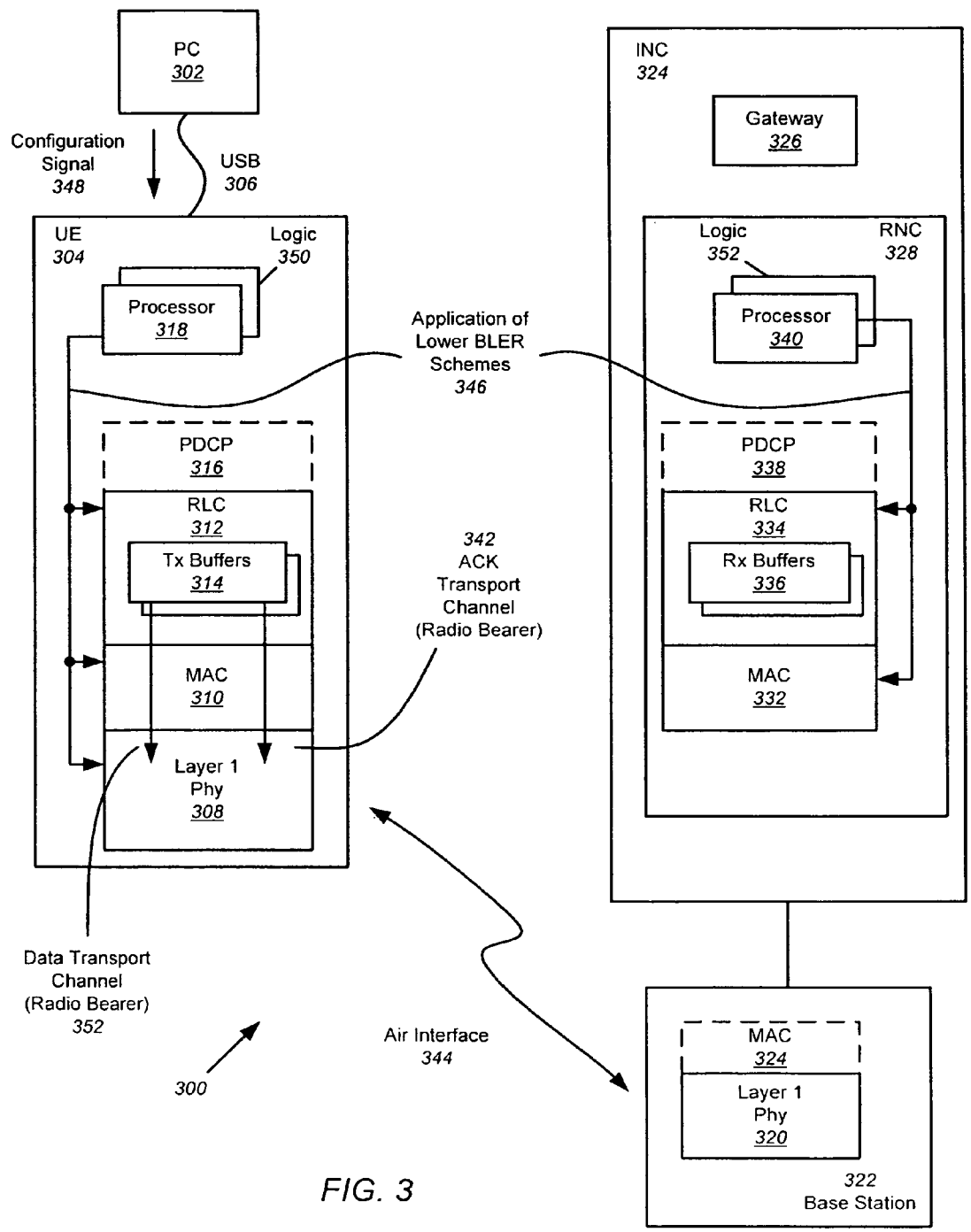
FIG. 3 illustrates an exemplary wireless communications system including additional ACK prioritization schemes according to embodiments of the invention.

FIG. 3 illustrates an exemplary wireless communications system 300 including additional ACK prioritization schemes according to embodiments of the invention. The wireless communication system 300 may comprise, but is not limited to, a packet data implementation of the international 3GPP Universal Mobile Telecommunications System (UMTS) standard. On the client or UE side, a processing device such as a personal computer (PC) 302 may be coupled to a communications interface apparatus such as a UE 304 through a connection such as a USB 306. The UE 304 may in one embodiment be a Personal Computer Memory Card International Association (PCMCIA) card capable of being into a PC, or a small external modem with a universal serial bus (USB) connection to the PC 302. In alternative embodiments, the UE 304 may be a chipset integrated into the PC 302, thereby eliminating the need for the connection 306.

The UE 304 contains a layer 1 or Phy interface 308 that modulates information and transmits and receives the information as wireless signals over the air interface 344. Above the layer 1 interface 308 is a Media Access Control (MAC) layer 310 that provides network control and access to the layer 1 interface. Above the MAC layer 310 is a Radio Link Control (RLC) layer 312, which contains or utilizes Tx buffers 314. Optionally, above the RLC layer 312 is a packet data convergence protocol (PDCP) layer 316 which handles header compression and other functions. The various functions and hardware associated with the various layers described above on the client side operate under the control of a processor 318 and/or dedicated or configurable logic 350 such as a state machine, all of which may be referred to herein as control logic.

On the network or server side is a layer 1 or Phy interface 320 that typically resides in a base station such as a "node B" base station 322. In some circumstances, a portion of the MAC layer 324 also resides in the base station 322. The base station 322 is coupled to an integrated network controller (INC) 324, which includes gateway functionality 326 and a Radio Network Controller (RNC) 328. The RNC 328 contains a MAC layer 332 that provides network control and access to the layer 1 interface. Above the MAC layer 332 is a Radio Link Control (RLC) layer 334, which contains or utilizes receive (Rx) buffers 336 coupled to separate data and ACK Rx radio bearers. Because the ACKs are received into separate bearers and Rx buffers as compared to the data, ACKs are never queued behind the data, and due to scheduler functionality are effectively prioritized as compared to the data. The received ACKs can therefore be processed without having to wait for data packets to be processed, resulting in lower RTT and higher throughput. Optionally, above the RLC layer 334 is a PDCP layer 338 which handles header compression and other functions. The various functions and hardware of the various layers described above on the network side operate under the control of a processor 340 and/or dedicated or configurable logic 352 such as a state machine. It should be understood, however, that the functionality illustrated in FIG. 3 is not constrained to the boxes and hierarchical configuration as shown.

As mentioned above, ACK prioritization is a well known technique which improves throughput, particularly in asymmetric links or when the UL is congested with other data. In conventional ACK prioritization, ACKs are identified by dedicated hardware or by the processor 318 and are then scheduled for transmission before data.

Embodiments of the invention expand upon conventional ACK prioritization, in particular in wireless systems where transmission over the air interface is frequently subject to transmission errors. Embodiments of the invention provide advantages when utilized in the system of FIG. 3, because increasing ACK prioritization results in lower RTT and increased throughput.

In a wireless communications system it is conventional to operate with a specified BLER and rely on a lower layer retransmission scheme to recover from any detected errors. In this way higher layers such as TCP see error-free insequence delivery of segments. The BLER is a representation of the number of block errors that may be expected to occur over a certain period of time. Note that it is generally not an efficient use of resources to attempt to operate at the lowest possible BLER, because of diminishing returns. For example, as more and more power is utilized in transmission, more interference is created. Thus, it is preferable to operate with a target BLER of perhaps 1% of blocks in error. However, lower layer retransmissions create increased latency due to the additional communications across the air interface. Therefore, in embodiments of the invention, in addition to conventional ACK prioritization, ACKs (as opposed to data) are subject to an even lower BLER over the air interface.

Embodiments of the invention achieve a lower BLER target for ACKs utilizing processes that include, but are not limited to, an increase in Tx power, additional coding for the ACK radio bearer, the use of diversity schemes, and the use of hybrid ARQ schemes. One or more of these techniques may be effectuated at the layer 1 interface, MAC layer, or RLC layer under control of the processor in either the UE 304 in the client side or the RNC 328 in the network side, as indicated symbolically by arrow 346. Each of these techniques will be discussed in turn.

The processor 318 in the UE 304 may increase the Tx power of the transmitter in the layer 1 interface 308 for ACKs to reduce transmission errors.

With regard to additional coding for the ACK radio bearer, after packets are in the UE 304 are identified as either ACKs or data, they are sent to separate data or ACK Tx buffers 314 through separate data and ACK radio bearers 352 and 342, respectively. Because the ACKs are transmitted over separate bearers and Tx buffers as compared to the data, ACKs are never queued behind the data, and are effectively prioritized as compared to the data. Additional coding such as forward error correction (FEC) may be executed by the processor 318 and applied to the ACKs on the ACK radio bearer 342 to ensure that the ACKs will be transmitted with a lower BLER.

On the network side, the RNC 328 receives the ACKs and data through separate ACK and data Rx radio bearers and Rx buffers 336, and is further enabled by processor 340 to detect, decode and recover (correct) bits that are in error without needing to re-transmit the data. For example, using FEC, a total of 40 or 60 bits may be transmitted as part of the ACK from the UE 304 even though there may be only 20 bits in the actual ACK. The more bits that are used, the more errors that can be tolerated. Additional FEC coding is an alternative to transmitting with more power.

Transmit diversity schemes include techniques such as transmitting from multiple antennas on the network side, and having the UE 304 determine the transmission path with the best performance (e.g. lowest BLER) and transmitting ACKs back to that antenna to obtain lower BLERs.

A hybrid ARQ retransmission scheme may also be employed by the RNC 328 and UE 304 to reduce the number of ACK retransmissions and increase throughput. One form of a hybrid ARQ scheme requires encoding the ACK and error-detection information (such as cyclic redundancy check (CRC)) with an error-correction code prior to transmission. At the RNC 328, if not all transmission errors can be corrected using the error-detection information and error-correction code, the incorrectly received coded ACK may be stored at a low layer rather than discarded. When a retransmitted coded ACK is received from the UE 304, the previously stored coded ACK and the newly received coded ACK may be combined prior to decoding to increase the probability of successful decoding.

Figure 4:
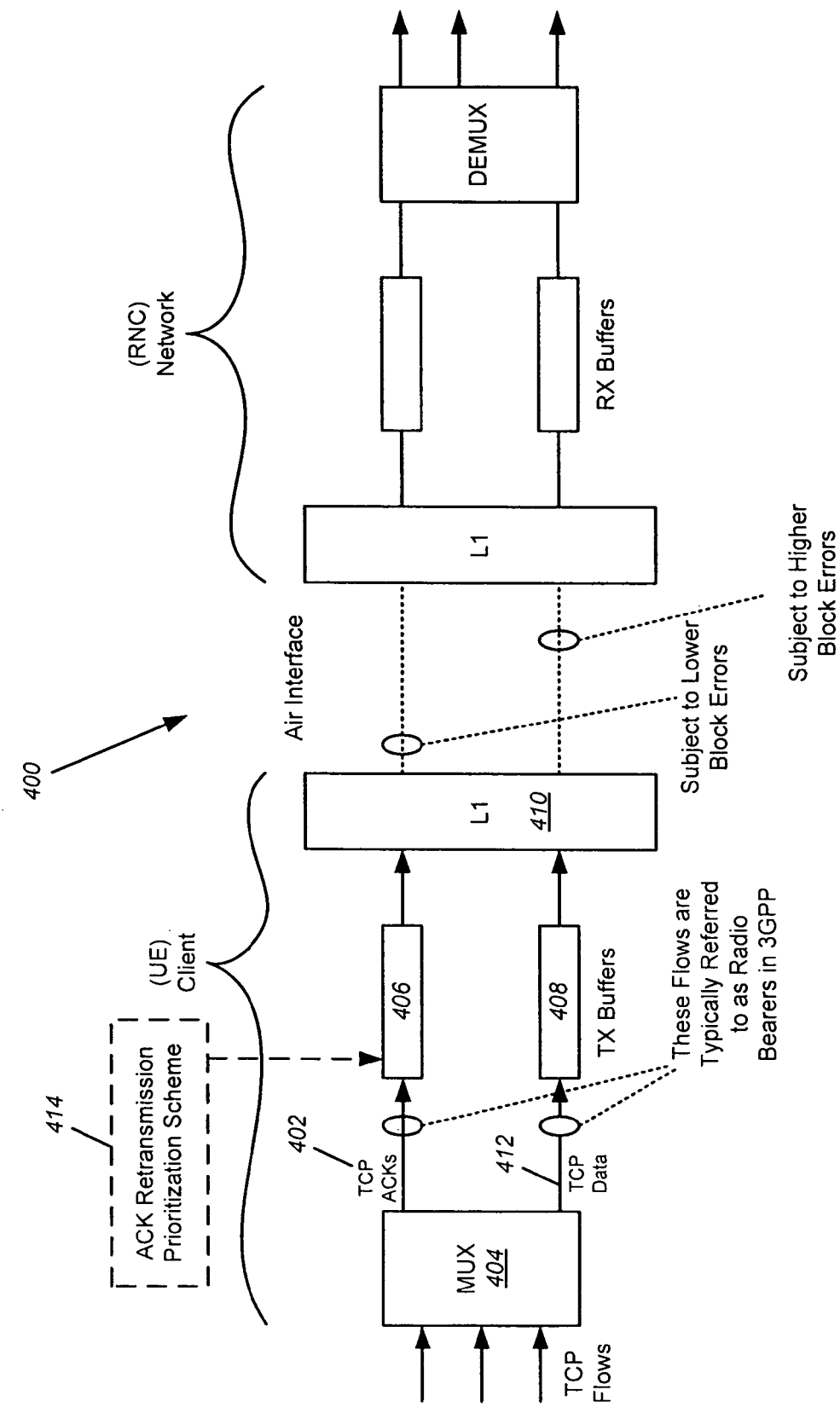
FIG. 4 is a simplified representation of a wireless communications link including a separate bearer for TCP ACKs according to embodiments of the invention.

FIG. 4 is a simplified representation of a wireless communications link 400 including a separate bearer 402 for ACKs and a separate bearer for data 412 according to embodiments of the invention. In FIG. 4, the mux 404 performs a packet sniffing or detection function, and determines whether a packet contains data or an ACK. As noted above, once the packets are identified, they are sent to separate Tx buffers over a separate radio bearer. Tx buffer 406 receives and queues ACKs, while Tx buffer 408 receives and queues data packets. The two Tx buffers 406 and 408 are seen at the layer 1 interface 410 as separate flows. Because the ACKs are transmitted over separate bearers and Tx buffers as compared to the data, ACKs are never queued behind the data, and are effectively prioritized as compared to the data. In addition, at the layer 1 interface 410 the radio bearer for ACKs 402 is subject to lower BLERs over the air interface as compared to the radio bearer for data 412 utilizing the techniques described above.

The additional Tx buffer 406 for ACKs is configurable by firmware in the UE or client side. A configuration signal (see 348 in FIG. 3) is received at the UE and can configure a pool of general-purpose buffers for this purpose. The configuration signal may configure the size of the Tx buffers 406 and 408 (and therefore how much data or ACKs can reside in the buffers) and the target BLER for each of the radio bearers. This signaling is referred to as radio bearer setup message, and may be sent from the RNC to the UE when the UE connects to the network. The mux 404 is usually configured by a separate message also when the UE initially connects to the network.

As mentioned above, because there are separate Tx buffers, there is effectively higher priority to the bearer with the ACKs because there is no need to wait for data in the Tx buffer to be transmitted. In addition, the UE may report buffer occupancy for each of the Tx buffers to the network, and the network may in turn allocate resources separately to each of the buffers. In other words, a scheduler in the UE may provide higher priority to the Tx buffer associated with the TCP ACKs by ensuring that more resources are allocated to the Tx buffer associated with TCP ACKs when its buffer occupancy exceeds that of the Tx buffer associated with TCP data.

In further embodiments of the invention, when retransmissions are required for an ACK packet the scheduling prioritization is increased successively for each retransmission required. For example, if there are ACK and data packets to be scheduled for transmission, and some of the data packets need to be retransmitted and some of the ACK packets need to be retransmitted for a first, second or third time, the scheduling order according to an embodiment of the invention would be, from highest priority to lowest:

ACKs retransmitted for $3^{rd}$ time;
ACKs retransmitted for $2^{nd}$ time;
ACKs retransmitted for $1^{st}$ time;
ACKs transmitted;
Data segments retransmitted; and
Data segments transmitted.

Thus, not only are ACKs prioritized over data, but retransmitted ACKs receive increasingly higher priority over other ACKs the more times they are retransmitted, although in alternative embodiments priority may be established according to any selected retransmission count sequence.

Note that there is a conventional discard procedure within a conventional retransmission protocol, wherein if the packet is retransmitted a certain number of times unsuccessfully, it is discarded. Therefore, the function of counting the number of times a packet has been retransmitted is well-known to those skilled in the art. However, embodiments of the invention enhance the conventional retransmission protocol to additionally determine prioritization of ACKs based on the number of times an ACK has been retransmitted. To implement this prioritization scheme, a separate ACK retransmission prioritization scheme 414 executed by a processor in the UE is associated with the ACK Tx buffer 406. Each ACK that goes into the ACK Tx buffer 414 is marked with a particular sequence number. The retransmission prioritization scheme 414 operating on the ACK Tx buffer 406 reads the sequence number on each ACK to identify the ACK, and further keeps track of how many times each uniquely identified ACK has been retransmitted. The ACKs are then scheduled according to the priority established by the retransmission prioritization scheme 414.

While the invention has been described in terms of particular embodiments and illustrative figures, those of ordinary skill in the art will recognize that the invention is not limited to the embodiments or figures described. Although embodiments of the invention are described, in some instances, using UMTS terminology and/or TCP, those skilled in the art will recognize that such terms are also used in a generic sense herein, and that the invention is not limited to such systems or protocols.

Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 5:
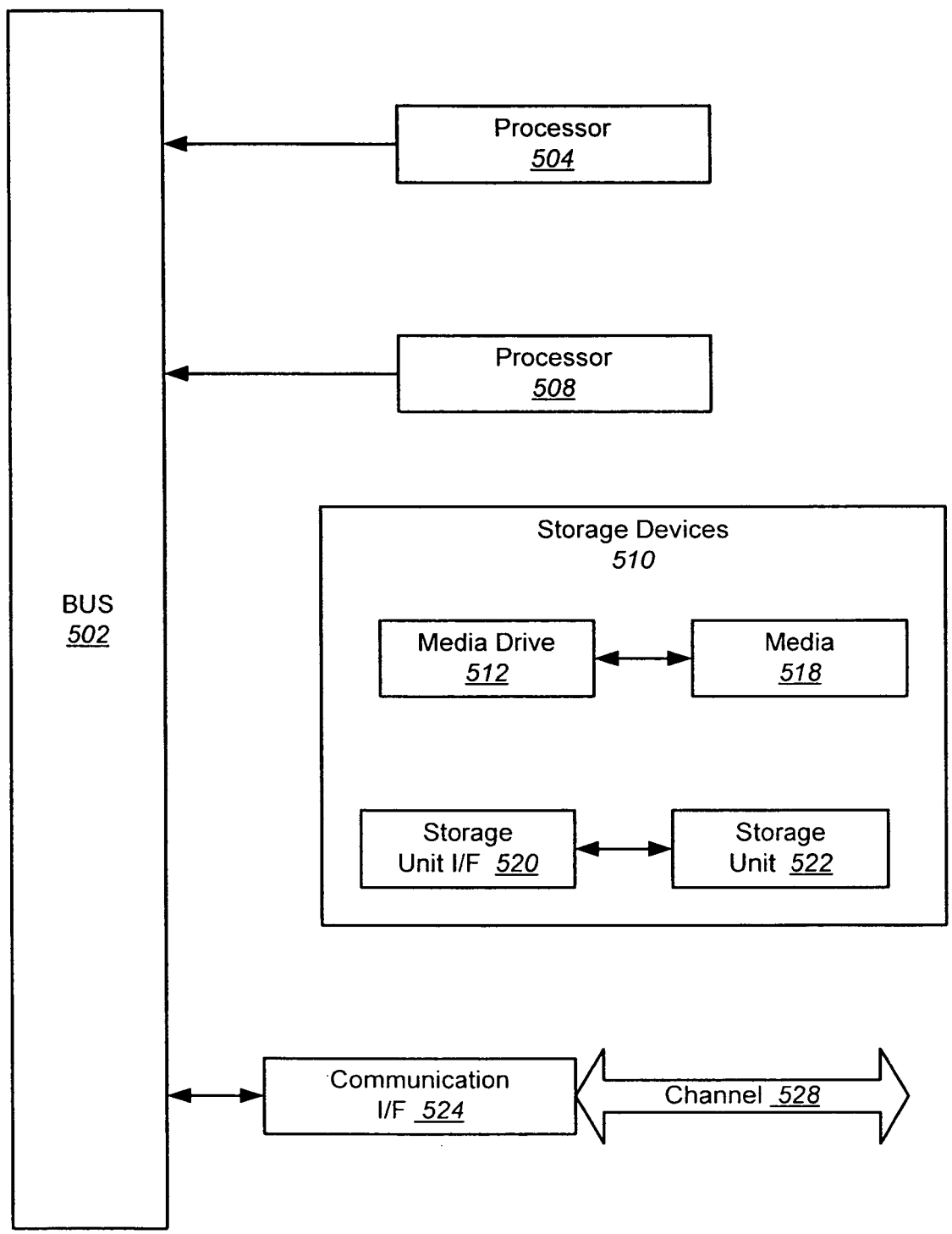
FIG. 5 illustrates an exemplary computer system that may be employed to implement embodiments of the invention.

FIG. 5 illustrates a typical computing system 500 that may be employed to implement processing functionality in embodiments of the invention. Computing systems of this type may be used in the UE and the base station, for example. Those skilled in the relevant art will also recognize how to implement the invention using other computer systems or architectures. Computing system 500 may represent, for example, a desktop, laptop or notebook computer, handheld computing device (personal digital assistant (PDA), cell phone, palmtop, etc.), mainframe, server, client, or any other type of special or general purpose computing device as may be desirable or appropriate for a given application or environment. Computing system 500 can include one or more processors, such as a processor 504. Processor 504 can be implemented using a general or special purpose processing engine such as, for example, a microprocessor, microcontroller or other control logic. In this example, processor 504 is connected to a bus 502 or other communications medium.

Computing system 500 can also include a main memory 508, such as random access memory (RAM) or other dynamic memory, for storing information and instructions to be executed by processor 504. Main memory 508 also may be used for storing temporary variables or other intermediate information during execution of instructions to be executed by processor 504. Computing system 500 may likewise include a read only memory (ROM) or other static storage device coupled to bus 502 for storing static information and instructions for processor 504.

The computing system 500 may also include information storage system 510, which may include, for example, a media drive 512 and a removable storage interface 520. The media drive 512 may include a drive or other mechanism to support fixed or removable storage media, such as a hard disk drive, a floppy disk drive, a magnetic tape drive, an optical disk drive, a compact disk (CD) or digital versatile disk (DVD) drive (R or RW), or other removable or fixed media drive. Storage media 518, may include, for example, a hard disk, floppy disk, magnetic tape, optical disk, CD or DVD, or other fixed or removable medium that is read by and written to by media drive 514. As these examples illustrate, the storage media 518 may include a computer-readable storage medium having stored therein particular computer software or data.

In alternative embodiments, information storage system 510 may include other similar components for allowing computer programs or other instructions or data to be loaded into computing system 500. Such components may include, for example, a removable storage unit 522 and an interface 520, such as a program cartridge and cartridge interface, a removable memory (for example, a flash memory or other removable memory module) and memory slot, and other removable storage units 522 and interfaces 520 that allow software and data to be transferred from the removable storage unit 518 to computing system 500.

Computing system 500 can also include a communications interface 524. Communications interface 524 can be used to allow software and data to be transferred between computing system 500 and external devices. Examples of communications interface 524 can include a modem, a network interface (such as an Ethernet or other network interface card (NIC)), a communications port (such as for example, a USB port), a PCMCIA slot and card, etc. Software and data transferred via communications interface 524 are in the form of signals which can be electronic, electromagnetic, optical or other signals capable of being received by communications interface 524. These signals are provided to communications interface 524 via a channel 528. This channel 528 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 508, storage device 518, or storage unit 522. These and other forms of computer-readable media may store one or more instructions for use by processor 504, to cause the processor to perform specified operations. Such instructions, generally referred to as "computer program code" (which may be grouped in the form of computer programs or other groupings), when executed, enable the computing system 500 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 500 using, for example, removable storage drive 514, drive 512 or communications interface 524. The control logic (in this example, software instructions or computer program code), when executed by the processor 504, causes the processor 504 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the invention has been described in connection with some embodiments, it is not intended to be limited to the specific form set forth herein. Rather, the scope of the invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

All patents, applications, published applications and other publications referred to herein are incorporated by reference herein in their entirety, including the following references:

[1]. 3GPP TS 25.331, "Radio Resource Control (RRC); Protocol specification", Release 6.
[2]. 3GPP TS 25.322, "Radio link Control (RLC); Protocol specification", Release 6.
[3]. 3GPP TS 25.321, "Medium Access Control (MAC); Protocol specification", Release 6.

What is claimed is:

1. A communications interface for providing acknowledgement packet (ACK) prioritization, comprising:
circuitry configured to
queue ACKs to be transmitted on an ACK radio bearer;
queue data packets to be transmitted on a data radio bearer, the data packets being queued separately from the ACKs; and
transmit ACKs with a lower block error rate (BLER) as compared to the BLER of transmitted data packets,
wherein the circuitry prioritizes transmission of an ACK before transmission of a data packet, and
the circuitry prioritizes retransmission of the ACKs in order of a number of previous retransmissions for each of the ACKs, an ACK having a largest number of previous retransmissions being assigned a highest priority.

2. The communications interface of claim 1, wherein the circuitry is further configured to transmit ACKs with a lower BLER by increasing transmit power when transmitting ACKs.

3. The communications interface of claim 1, wherein the circuitry is further configured to transmit ACKs with a lower BLER by providing additional coding for the ACK radio bearer.

4. The communications interface of claim 1, wherein the circuitry is further configured to transmit ACKs with a lower BLER utilizing a diversity scheme.

5. The communications interface of claim 4, wherein the diversity scheme includes:
receiving transmissions from multiple antennas,
determining a path providing lowest BLERs, and
transmitting ACKs back to the antenna providing the lowest BLERs.

6. The communications interface of claim 1, wherein the circuitry is further configured to transmit ACKs with a lower BLER by utilizing a hybrid automatic repeat request (ARQ) scheme.

7. The communications interface of claim 6, wherein the hybrid ARQ scheme includes encoding an ACK along with error-detection information with an error-correction code prior to transmission of the ACK.

8. The communications interface of claim 1, wherein the communications interface is located within user equipment (UE).

9. The communications interface of claim 8, wherein the UE is coupled to a processing device, the UE and processing device representing a client side of an air interface.

10. The communications interface of claim 9, wherein the communications interface communicatively couples to a radio network controller (RNC) over the air interface.

11. The communications interface of claim 10, wherein the communications interface is further coupled to a base station over the air interface.

12. A communications system for providing acknowledgement packet (ACK) prioritization, comprising:
user equipment (UE) including
circuitry configured to
queue ACKs to be transmitted on an ACK radio bearer,
queue data packets to be transmitted on a data radio bearer, the data packets being queued separately from the ACKs, and
transmit ACKs with a lower block error rate (BLER) as compared to the BLER of transmitted data packets, wherein the circuitry prioritizes transmission of an ACK before transmission of a data packet, and the circuitry prioritizes retransmission of the ACKs in order of a number of previous retransmissions for each of the ACKs, an ACK having a largest number of previous retransmissions being assigned a highest priority; and
a radio network controller (RNC) including circuitry to communicatively couple to the UE over an air interface.

13. The communications system of claim 12, further comprising a processing device to communicatively couple to the UE over a serial connection.

14. The communications system of claim 12, further comprising a base station to communicatively couple to the UE over the air interface.

15. A method for providing acknowledgement packet (ACK) prioritization, comprising:
queuing ACKs to be transmitted on an ACK radio bearer;
queuing data packets to be transmitted on a data radio bearer, the data packets being queued separately from the ACKs; and transmitting ACKs with a lower block error rate (BLER) as compared to the BLER of transmitted data packets, by prioritizing the transmission of an ACK before transmission of a data packet, wherein retransmission of the ACKs is prioritized in order of a number of previous retransmissions for each of the ACKs, an ACK having a largest number of previous retransmissions being assigned a highest priority.

16. The method of claim 15, further comprising transmitting ACKs with a lower BLER by increasing transmit power when transmitting ACKs.

17. The method of claim 15, further comprising transmitting ACKs with a lower BLER by providing additional coding for the ACK radio bearer.

18. The method of claim 15, further comprising transmitting ACKs with a lower BLER utilizing a diversity scheme.

19. The method of claim 18, wherein the diversity scheme includes receiving transmissions from multiple antennas, determining a transmission path providing lowest BLERs and transmitting ACKs back to the antenna providing the lowest BLERs.

20. The method of claim 15, further comprising transmitting ACKs with a lower BLER by utilizing a hybrid automatic repeat request (ARQ) scheme.

21. The method of claim 20, wherein the hybrid ARQ scheme includes encoding an ACK along with error-detection information with an error-correction code prior to transmission of the ACK.

22. A non-transitory computer-readable storage medium encoded with executable instructions for providing acknowledgement packet (ACK) prioritization that, when executed by a processor of a data processing apparatus, direct the processor to perform:

queuing ACKs to be transmitted on an ACK radio bearer;

queuing data packets to be transmitted on a data radio bearer, the data packets being queued separately from the ACKs; and transmitting ACKs with a lower block error rate (BLER) as compared to the BLER of transmitted data packets, by prioritizing the transmission of an ACK before transmission of a data packet, wherein retransmission of the ACKs is prioritized in order of a number of previous retransmissions for each of the ACKs, an ACK having a largest number of previous retransmissions being assigned a highest priority.

23. The non-transitory computer-readable storage medium of claim 22, further comprising transmitting ACKs with a lower BLER by increasing transmit power when transmitting ACKs.

24. The non-transitory computer-readable storage medium of claim 22, further comprising transmitting ACKs with a lower BLER by providing additional coding for the ACK radio bearer.

25. The non-transitory computer-readable storage medium of claim 22, further comprising transmitting ACKs with a lower BLER utilizing a diversity scheme.

26. The non-transitory computer-readable storage medium of claim 25, wherein the diversity scheme includes receiving transmissions from multiple antennas, determining a transmission path providing lowest BLERs and transmitting ACKs back to the antenna providing the lowest BLERs.

27. The non-transitory computer-readable storage medium of claim 22, further comprising transmitting ACKs with a lower BLER by utilizing a hybrid automatic repeat request (ARQ) scheme.

28. The non-transitory computer-readable storage medium of claim 27, wherein the hybrid ARQ scheme includes encoding an ACK along with error-detection information with an error-correction code prior to transmission of the ACK.

29. A radio network controller (RNC) for assisting user equipment (UE) in providing acknowledgement packet (ACK) prioritization in which ACKs are arranged in order of previous retransmissions, and an ACK having a largest number of previous retransmissions is assigned a highest priority, comprising:

circuitry configured to queue ACKs received on an ACK radio bearer;

queue data packets received on a data radio bearer, the received data packets being queued separately from the ACKs; and receive additional ACKs containing additional error detection and correction coding and detect, decode and recover bits that are in error without retransmission of the ACK, wherein the circuitry prioritizes reception of the ACK before reception of data packets.

30. The radio network controller (RNC) of claim 29, wherein the circuit is further configured to:

store an incorrectly received coded ACK at a low layer;

receive a retransmitted coded ACK; and combine the incorrectly received coded ACK and the retransmitted coded ACK prior to decoding to increase the probability of successful decoding.

31. A method for assisting user equipment (UE) in providing acknowledgement packet (ACK) prioritization in which ACKs are arranged in order of previous retransmissions, and an ACK having a largest number of previous retransmissions is assigned a highest priority, comprising:

queuing ACKs received through an ACK radio bearer;

queuing data packets received through a data radio bearer, the data packets being queued separately from the ACKs; and receiving additional ACKs containing additional error detection and correction coding and detecting, decoding and recovering bits that are in error without retransmission of the ACK, by prioritizing the receiving of the ACK before receiving data packet.

32. The method of claim 31, further comprising:

storing an incorrectly received coded ACK at a low layer;

receiving a retransmitted coded ACK; and combining the incorrectly received coded ACK and the retransmitted coded ACK prior to decoding to increase the probability of successful decoding.

33. A non-transitory computer-readable storage medium encoded with executable instructions for assisting user equipment (UE) in providing acknowledgement packet (ACK) prioritization in which ACKs are arranged in order of previous retransmissions, and an ACK having a largest number of previous retransmissions is assigned a highest priority, the executable instructions, when executed by a processor of a data processing apparatus, direct the processor to perform, at a receiver:

queuing ACKs received through an ACK radio bearer;

queuing data packets received through a data radio bearer, the data packets being queued separately from the ACKs; and receiving additional ACKs containing additional error detection and correction coding and detecting, decoding and recovering bits that are in error without retransmission of the ACK, by prioritizing the receiving of the ACK before receiving data packet.

34. The computer-readable storage medium of claim 33, further comprising instructions for:

storing an incorrectly received coded ACK at a low layer;

receiving a retransmitted coded ACK; and
combining the incorrectly received coded ACK and the retransmitted coded ACK prior to decoding to increase the probability of successful decoding.

35. The communications interface of claim 1, wherein the ACK is an IP packet which has a zero length data field.

36. The communications interface of claim 1, wherein the ACK radio bearer and the data radio bearer are a single radio bearer.

37. The communications interface of claim 1, wherein the ACK radio bearer is separate from the data radio bearer.

38. A communications interface for providing acknowledgement packet (ACK) prioritization, comprising:
circuitry configured to
queue ACKs to be transmitted on an ACK radio bearer;
queue data packets to be transmitted on a data radio bearer, the data being queued separately from the ACKs, and wherein the ACK radio bearer and the data radio bearer are a single radio bearer; and
transmit ACKs with a lower block error rate (BLER) as compared to the BLER of transmitted data packets, wherein the circuitry prioritizes transmission of the ACK before transmission of the data packets, and the circuitry prioritizes retransmission of the ACKs in order of a number of previous retransmissions for each of the ACKs, an ACK having a largest number of previous retransmissions being assigned a highest priority.

39. The communications interface of claim 1, wherein the circuitry is further configured to transmit all ACKs before transmitting any data packet.

40. The communications interface of claim 1, wherein an ACK having a lowest number of retransmissions has a lowest priority among the ACKs, and the circuitry is further configured to retransmit the ACKs in order from a highest priority ACK to a lowest priority ACK.

41. The communications interface of claim 1, wherein an ACK having a lowest priority among the ACK has a higher priority than a highest priority data packet.

42. The radio network controller of claim 29, wherein the additional error detection and correction coding includes forward error correction (FEC) coding.

43. The radio network controller of claim 29, wherein the additional error detection and correction coding includes cyclic redundancy check (CRC) coding.

* * * * *